Sept. 29, 1959  J. A. CRAVERO  2,906,474
SPEED-RESPONSIVE CONTROL SYSTEM FOR VEHICLE STEERING MECHANISMS
Filed June 1, 1954  3 Sheets-Sheet 1

INVENTOR.
Joseph A. Cravero
BY
Charles S. Wilson
ATTORNEY.

Sept. 29, 1959   J. A. CRAVERO   2,906,474
SPEED-RESPONSIVE CONTROL SYSTEM FOR VEHICLE STEERING MECHANISMS
Filed June 1, 1954   3 Sheets-Sheet 2

INVENTOR.
Joseph A. Cravero
BY
Charles J. Wilson
ATTORNEY.

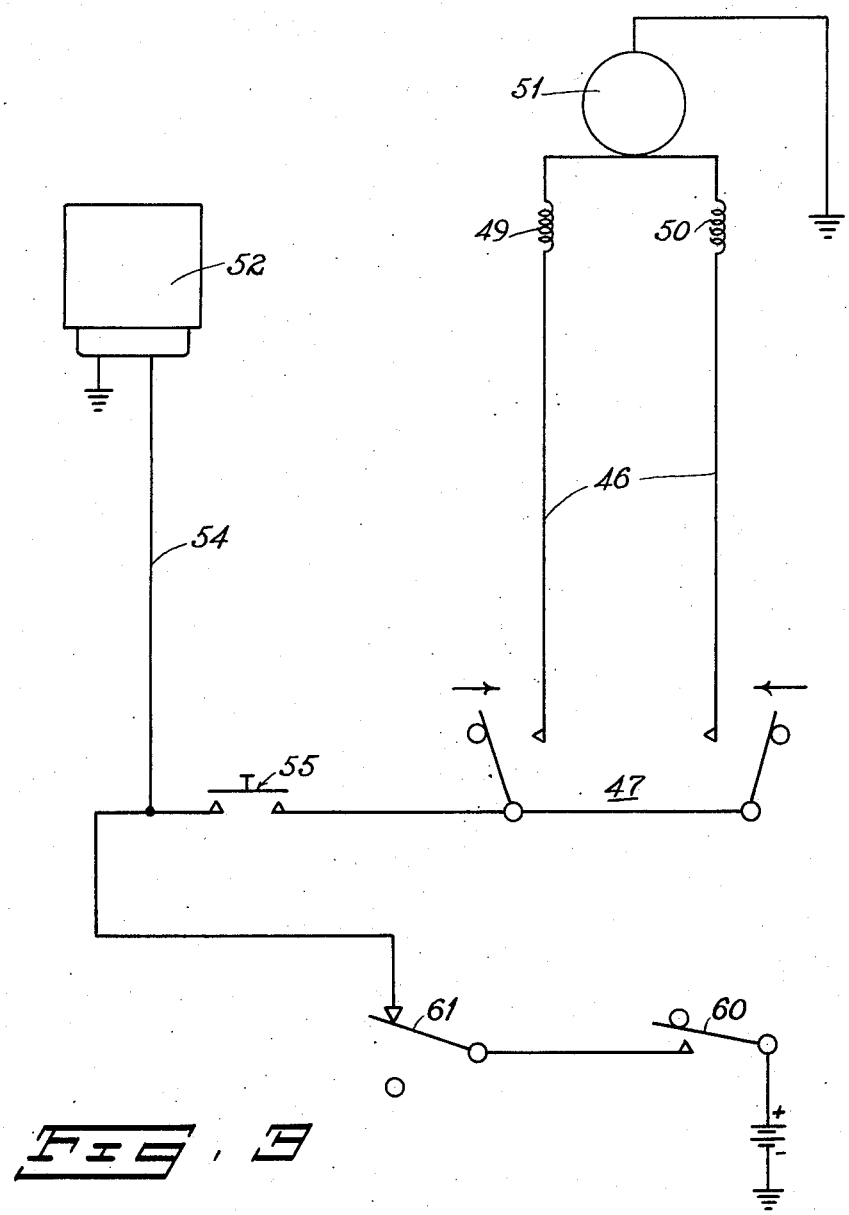

United States Patent Office
2,906,474
Patented Sept. 29, 1959

2,906,474

SPEED-RESPONSIVE CONTROL SYSTEM FOR VEHICLE STEERING MECHANISMS

Joseph A. Cravero, East Farmingdale, N.Y., assignor to Republic Aviation Corporation, Farmingdale, N.Y., a corporation of Delaware Application June 1, 1954, Serial No. 433,693

16 Claims. (Cl. 244—50)

This invention relates to improvements in steering mechanisms for vehicles generally and, more particularly, to a steering system by which the landing gear wheel or wheels of an airplane may be allowed to caster or swivel or, at the option of the pilot, be locked against castering and then by hydraulically steered.

Moreover, the subject invention includes means whereby the shimmy damper or restricting unit, usually associated with castered landing gear wheels, may be employed to steer the vehicle or airplane.

Among its other objects, the invention has in view a control automatically responsive to the speed of the taxiing airplane to regulate or restrict the amount or degree of steering by the pilot thereby to prevent excessive steering or overcontrol of the airplane on the ground.

With the above and other objects in view, as will be apparent, this invention consists in the construction, combination and arrangement of parts all as hereinafter more fully described, claimed and illustrated in the accompanying drawings, wherein:

Fig. 3 is a wiring diagram of the circuits and schematic representations of the associated electrical components of the present invention arranged for use in the application thereof as shown in Figs. 1 and 2.

Figure 1:
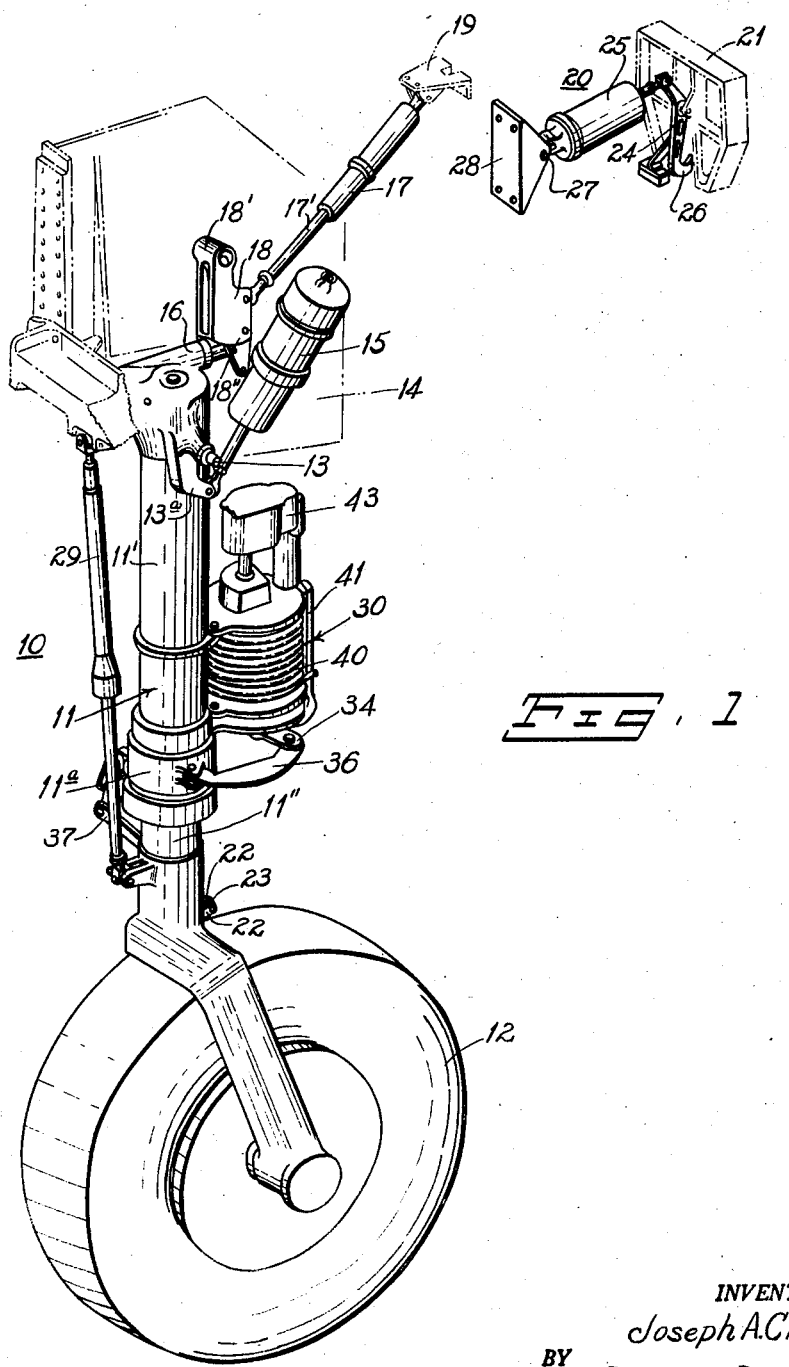
Fig. 1 is a perspective view and illustrates the present invention as applied to a conventional retractable airplane landing gear unit, or nose wheel assembly, shown in the down or protracted position, portions of the airplane structure being shown in phantom lines.

While the instant invention can be of general application and may be adapted and employed wherever a steering system is required, it has particular utility in airplanes. Airplanes, and especially the jet propelled airplanes, not only fly increasingly faster but also land and take off at proportionally increased speeds. Heretofore, the landing, take-off and taxiing speeds were relatively low and the steering of the airplane on the ground was generally accomplished by and through the manipulation and adjustment of the rudder, commonly known as rudder control. Hence, by angularly displacing the rudder relative to the line of travel, the aft end of the airplane is accordingly turned or rotated about the forward end thereof to change the path or direction of travel.

In the case of high-speed airplanes rudder control is not too practical, since a maximum displacement of the rudder is often insufficient to effectively move or swing the aircraft to accomplish the required steering. Under such conditions, that is, where rudder control is attempted on the ground with high-speed airplanes, the course or direction of the airplane is altered only by laterally sliding or scrubbing of the nose wheel. Obviously, such an operation is undesirable, even when it occasionally may be possible to thereby steer the airplane.

Therefore, the present invention proposes to overcome the foregoing, as well as other objectionable features by the direct adjustment of the landing gear wheel and/or wheels for ground steering the airplane. This steering is not only instantaneous in operation, but it may be automatically controlled in the amount or degree to eliminate the possibility of oversteering or over-control thereby preventing any tendency to spin, overturn or ground loop.

Moreover, since there are times during the operation of the airplane when it is desirable to locate the gear in a specific or predetermined position such as, for example, when it is being retracted into the airplane after take-off, the present invention contemplates and includes means for the disconnection of the steering mechanism. In short, according to this invention, the steering mechanism is operative at the option of the pilot while the airplane is on the ground; however, at no time after the airplane becomes airborne or is in flight may the landing gear be capable of deflection from its position for retraction or protraction.

To the above ends the instant invention proposes a device controllable by the pilot and operative only when the landing gear is protracted or extended and in contact with the ground. This device is usually to be associated with the front or nose landing gear wheel and more particularly with the shimmy damper or other restricting unit customarily associated with castered landing gear wheels. Such damper is provided on castered wheels and operates to impose balanced pressures on opposite sides of the axis of rotation of the associated wheel which prevents shimmy or excessive oscillation of the spindle of the wheel.

When the pilot desires to steer or turn the airplane while it is moving on the ground, he actuates or controls the damper to throw the pressures applied to the wheel spindle out of balance, i.e., imposes greater pressure on one side of the axis of the spindle of the wheel than on the opposite side thereby causing the wheel to be displaced or turned. This operation of the damper control is comparatively unlimited at low ground speeds of the airplane. However, as the ground speed of the airplane, as measured by the rotation of the wheel, increases a control applied automatically and concurrently with the increase of speed operates to restrict or limit the range of steering movement in proportion to the increase in speed.

Reference being now had more particularly to the drawings, 10 designates generally a standard or conventional landing gear assembly. Broadly, this assembly comprises a shock strut 11, consisting of an upper section 11′, a spindle 11″ swivelled in and telescoped with the upper section 11′ of the strut 11, a wheel or ground engaging element 12 mounted for rotation at the outer end of said spindle 11″ and a trunnion 13 at the inner end of the upper section 11′ by which the entire strut is journalled to the airplane structure generally designated as 14, for retraction and/or extension. An arm or ear 13a is fixed to and projects laterally from the trunnion 13 for connection with one end of a power unit or hydraulic jack 15 which is anchored at its opposite end to the airplane structure 14. Thus, when the power unit 15 is actuated through and by any conventional control means, the strut 11 is swung or rotated relative to the structure 14 to and from its down or protracted position.

Also projecting laterally from the trunnion 13 and fixed thereto is an extension 16 for cooperation with a down-lock mechanism 17 through a bellcrank lever or latch 18. This down-lock mechanism 17 consists of a hydraulic jack or equivalent power unit mounted at one of its ends on the fixed structure 19 within the airplane and at its opposite end is eccentrically attached to the pivoted latch 18 through its piston rod 17'. At one end 18', the latch 18 is pivotally mounted to the airplane structure 14 and at its other end 18" engages the extremity of the extension 16 so that the expansion or contraction of the power device 17 rotates the latch 18 about its pivot 18' whereby to allow or prevent movement of the extension 16. Thus the shock strut 11 is maintained in its down or projected position and is held against movement by the latch 18. To release the strut 11 for retraction, the extension or outward urge of mechanism 17 is overcome mechanically or hydraulically to disengage the latch 18 from the extension 16 whereupon the strut may be retracted into the airplane by the power unit 15.

When the down-lock mechanism 17 is overcome or shrunk and the strut 11 is retracted into the airplane through the operation of the power unit 15, it engages and is automatically secured by an up-lock unit 20 mounted on adjacent fixed structure 21 within the airplane. To this end a pair of lateral projections or ears 22 are formed on or secured to the outer end of the lower or inner section 11" of the shock strut 11 adjacent the wheel 12 to mount a roller 23 between them. This roller 23 contacts and is engaged by the up-lock unit 20 within the airplane when the strut 11 reaches the limit of its upward travel in retraction.

The up-lock mechanism 20 comprises a bellcrank lever 24 pivotally connected at its elbow to the fixed structure 21 of the airframe, a power actuator 25 attached to one end of the lever 24 and a hook or catch 26 integral with the other end of said lever. As in the down-lock mechanism 17, the actuator 25 preferably consists of a hydraulic jack or motor, one end of which is anchored, as at 27, to fixed structure 28 of the airframe, while the other end is pivotally attached to that end of lever 24 opposed to the hook or catch 26. However, unlike the power unit 17, the actuator 25 is normally compressed or retracted so that hook or latch 26 is thereby forced or rotated relative to the airplane to normally occupy its closed or locked position.

From the foregoing, it is apparent that, when the shock strut 11 is retracted into the aircraft after take-off, roller 23 contacts the edge of latch 26 causing the lever 24 to move against the normal action of the power actuator 25. As the strut 11 continues to raise or retract, the roller 23 clears the end surface of hook 26 and the lever 24 springs or snaps back under the normal operation of the actuator 25. The roller 23 is thereby engaged and held in the hook 26 of the latch so as to support and lock the strut 11 in its upward or retracted position.

In order to land the airplane the shock strut 11 is lowered or extended by first actuating the power unit 25 through any well-known means and connections provided for the operation thereof. This serves to rotate the lever 24 to withdraw the latch or hook 26 from engagement with the roller 23. At this time, the actuation or expansion of the power unit 15 moves the strut 11 downwardly and outwardly on its trunnion 13 whereby said strut is disposed in its fully extended position and there locked by the automatic operation of the mechanism 17 as above described.

A shrinking link 29 is also pivotally secured at one of its ends to the outer telescopic component or spindle 11" of the shock strut 11 and at its other end to the airplane structure 14. Generally, this device 29 consists of a pair of telescopic rods or links which are constantly compressed or urged inward one of the other and serve to collapse or shrink the telescopic shock strut 11 to its minimum length upon the retraction thereof so that said strut 11 occupies the smallest possible area or space within the airplane structure when retracted.

All of the foregoing structure and arrangement and the described operation thereof is more or less conventional and with variations is standard in landing gear assemblies. No invention is claimed in the above-described landing gear assembly per se. The only purpose served in illustrating and describing this landing gear assembly per se is to more clearly define the structure and operation of the present system as it is adapted to, and operates in conjunction with, such an assembly.

The landing gear assembly of the type considered herein is usually associated with a damper to restrict the oscillation or shimmy of the castered wheel 12 in combination with a device to center said wheel fore and aft for retraction. It is toward the modification and use of this damper for ground steering that the present invention is primarily directed.

Figure 2:
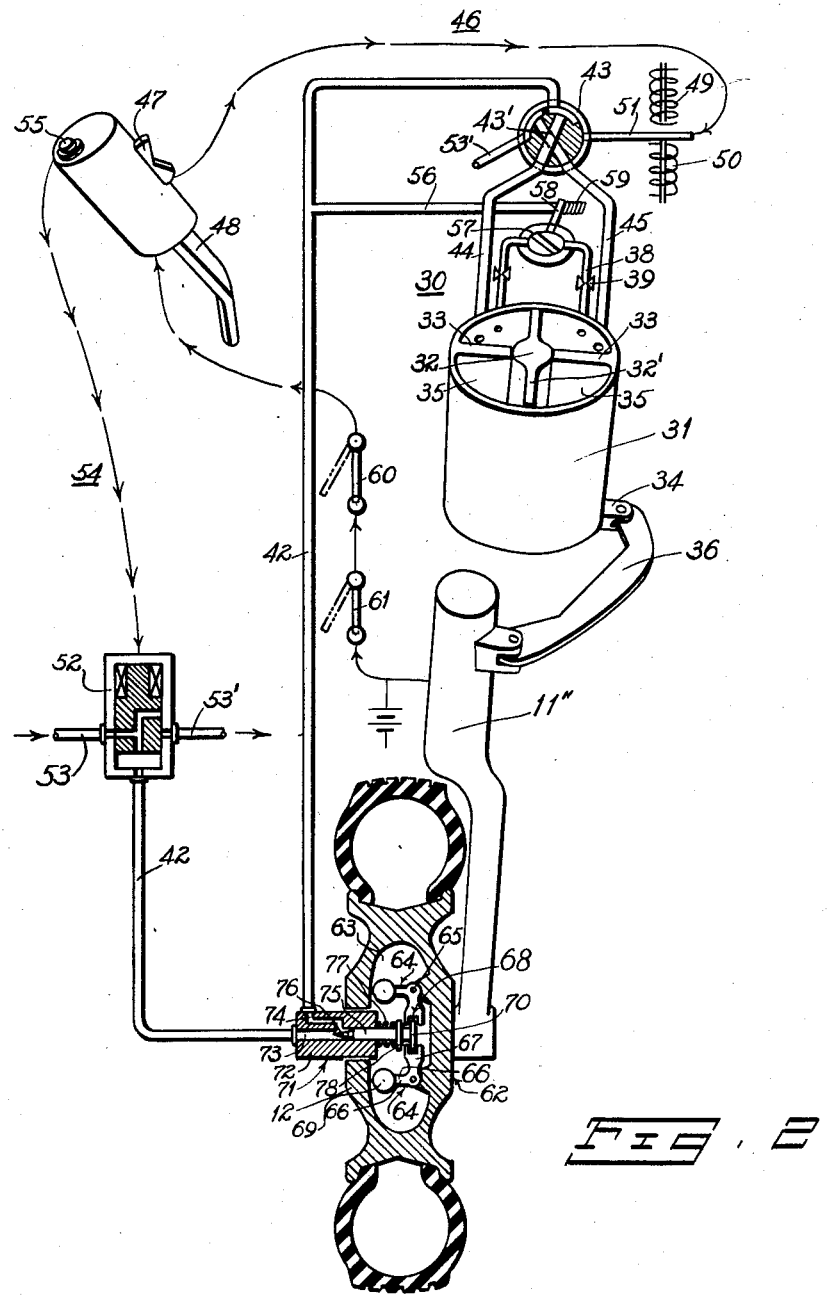
Fig. 2 is a schematic layout of the present steering system, partly in section and partly in perspective, to more clearly show the components thereof and their operation.

This shimmy damper 30 (Figs. 1 and 2) is provided with a cylindrical housing or container 31 fixedly attached to the upper section 11' of the strut 11 in which a concentric rotary shaft 32 is mounted and housed. A pair of vanes 32', substantially equal in length to the inside diameter of the cylinder or container 31, are secured to the shaft 32 and are diametrically disposed on opposite sides thereof. These vanes move in unison with the shaft 32 and terminate at the inner surface of the wall of the housing 31. For cooperation with the vanes 32' a pair of stationary partitions 33 are fixed to and extend inwardly from the inner surface of the housing 31. These partitions 33 are aligned one with the other diametrically of the housing 31 and terminate at the surface of the shaft 32. Thus, the vanes 32' both lie in a common plane which is disposed at right angles to the common plane of the partitions 33 when the wheel 12 is in its fore and aft position.

From the foregoing it is manifest that the vanes 32' and partitions 33 are so disposed within the housing 31 that four individual chambers or compartments 35 are created. Moreover, it is also apparent that the partitions 33 are fixed against movement relative to the housing 31, while the vanes 32' rotate within the housing to vary the size of the chambers 35. It is to be noted, however, that when the shaft 32 and vanes 32' are rotated, two of the chambers 35 decrease in size while the remaining two chambers 35 increase in size. When the wheel 12 is in its fore and aft position the chambers 35 are all substantially equal in size.

The shaft 32 pierces and projects beyond the bottom end wall of the housing 31, where it has an arm 34 attached thereto to project outwardly beyond the wall of the housing 31. At its outer end the arm 34 is pivoted to one extremity of a link 36, the opposite end of the link 36 being pivotally connected to a collar 11a loosely mounted on the cylinder or upper section 11' of the strut 11. A pair of conventional arms or scissors 37 are interposed between the collar 11a and the spindle 11". Thus, rotary movement of the spindle 11", due to the castering of the wheel 12, is imparted to the shaft 32 and vanes 32' of the damping unit 30 by means of the scissors 37, collar 11a and the link 36 and arm 34 all of which move in unison with any rotary movement of the spindle 11" relative to upper section or cylinder 11' of the strut 10.

When the vanes 32' are centered, that is the partitions 33 and vanes 32' are disposed approximately at right angles and hydraulic fluid under pressure is sealed within the chambers 35 of the housing 31, the vanes 32' and shaft 32 are restrained against excessive rotation or movement within the housing 31. Hence, the forces or loads imposed upon the wheel 12 are suppressed and absorbed by means of the damping unit 30.

In order to vent fluid from the chambers 35 which are reduced in size upon the rotation of the vanes 32', bypass or bleed lines 38 are provided between two of the chambers 35 on either side of the plane of the vanes 32'. These lines 38 merely permit the free flow of hydraulic fluid from a compartment 35 of reduced size to a compartment 35 of increased size as the shaft 32 and the vanes 32' carried thereby oscillates to vary the size of said compartments. The lines or pipes 38 may be restricted by any metering devices such as the needle valves 39.

Associated with the damping or restricting unit 30 is the centering mechanism which generally comprises a coil spring 40 which encircles the housing 31 of said unit. The opposed ends of this spring 40 are connected to the shock strut cylinder or upper section 11' at one end and to an arm or plate 41 at the opposite end. This arm 41 is disposed substantially parallel to the exterior of the housing 31 and is secured so as to constitute an integral outer end of the arm 34 fixed to the projecting end of the shaft 32. In this way, movement of the link 36, due to the castering of the wheel 12, serves to unbalance or load the spring 40 which constantly tends to return to its initial or fore and aft position. Hence, when the weight is removed from the wheel 12, as when the aircraft becomes airborne, the spring 40 serves to relieve itself or return to its central, predetermined position so as to dispose the wheel 12 in its fore and aft position prior to retraction into the aircraft.

The instant invention contemplates a steering system primarily in association with and operative through the damping unit 30. To this end, a supply pipe or line 42 delivers hydraulic fluid under pressure from a remote reservoir or source (not shown) to the unit 30. A rotary valve 43 is always connected to the pipe line 42 and, when actuated, operates to direct the fluid from the pipe 42 to one side or the other of at least one of the vanes 32' through either of a pair of branch lines or pipes 44 and 45. Regardless of its position the rotary valve 43 is always connected to the supply line or pipe 42 but when valve 43 is in its normal or neutral position, i.e., with its duct 43' disposed between the entrances to the branch lines or pipes 44 and 45, hydraulic fluid from the supply line 42 is blocked by the valve from delivery to either of said branch lines or pipes.

A standard electric teeter switch 47 in a circuit 46 serves to control the actuation or movement of the valve 43 out of its normal or neutral position for the connection of either of the branch pipes or lines 44 or 45 with the supply pipe line 42. This electrical circuit 46 when energized by or through the teeter switch 47, located in the cockpit of the airplane preferably on the handle 48 of the engine throttle or accelerator, energizes one or the other of a pair of coils 49 or 50 of a relay or other suitable electrical actuator, the armature 51 of which is connected to the valve 43. The energizing of the coil 50 attracts the armature 51 and rotates the valve 43 in the direction to connect branch line 44 to the supply line 42; while the energizing of the coil 49 attracts the armature 51 and rotates this valve in the reverse direction to connect the branch line 45 to the supply line 42. When neither coil is energized the valve 43 assumes its neutral position and neither branch line is connected to the supply line. Thus, hydraulic fluid under pressure may be delivered from the source through line 42 through one or the other of the branch lines 44 and 45 to either side of vanes 32' for the rotation thereof. This movement of the vanes 32' is transmitted to the shaft 32 for directional rotation of wheel 12 and its spindle as above described.

A solenoid valve 52 is interposed in supply line 42 between the feed line 53 leading from the source of hydraulic fluid under pressure and the supply line 42 and rotary valve 43 to control the passage of hydraulic fluid from the feed line 53 through the supply pipe 42. The valve 52 can be operated either to prevent the flow of fluid from the feed line 53 to the supply line 42 and at the same time to permit a return flow of fluid from the line 42 to and through the valve 52 and back to the source through a return line 53', or to connect the feed line 53 directly to the supply line 42 and simultaneously close the return line 53'. An electric circuit 54 which is energized by a button switch 55 located on the throttle 48, actuates the solenoid valve 52 for the disconnection of the return 53' from the line 42 and the simultaneous connection of the line 42 with the source. When the valve 52 is adjusted to connect the feed line 53 with the supply line 42 fluid under pressure is available at the rotary valve 43 for delivery to either of the branch lines or pipes 44 or 45 and simultaneously is delivered to and through a spur line 56 which is connected to or tapped off the supply line 42. The passage of fluid from the supply line 42 to either branch line 44 or 45 through the control valve 43 requires that the by-pass 38 be closed and for this purpose a rotary valve 57 is disposed in the by-pass. This valve 57 normally maintains said by-pass 38 open for the passage of fluid therethrough, a spring or other suitable means 59 being provided for that purpose. Upon the actuation of solenoid 52 to admit pressurized fluid into the supply line 42 and spur line 56, fluid pressure in the spur pipe 56 acts upon the control bar 58 of the valve 57 to move it against the action of the spring 59; the valve 57 is positioned to close the by-pass 38.

To prevent the possibility of operation of the steering system while the gear is up or retracted, a pair of switches 60 and 61 are disposed in the electrical circuit of the system. Switch 60 is associated with the down-lock mechanism 17 in any suitable and well-known manner whereby it closes or completes the circuit only when the strut 11 is locked in the downward or protracted position. Switch 61, on the other hand, is associated with the scissors 37 and is actuated to close and complete the circuit only at such time when the scissors are compressed due to the weight of the aircraft on strut 11. Thus, until and unless the landing gear assembly 10 is in its protracted position and bears the weight of the airplane when grounded, no part of the electrical circuit of the present system can be energized.

In order to control the degree or amount of steerability of the wheel 12, the invention further proposes a control which is automatically regulated and adjusted to the exclusion of, and irrespective of any action by, the pilot or operator. This control consists of a centrifugal governor 62 located in the wheel 12. The wheel 12 being hollow provides a well 63 for the disposition therein of a pair of bellcrank levers 64, each of which is pivotally mounted to the fixed structure of the wheel 12 as at 65. These bellcranks 64 are identical one with the other and are disposed in opposition to each other at an equal distance from the axis of rotation of the wheel 12. Each bellcrank lever 64 comprises a pair of arms 66 and 67 which are disposed at substantial right angles one to the other with arm 67 approximately normal to the axis of wheel 12. The arm 67 of each bellcrank 64 is bifurcated at its outer end as at 68, while the arm 66 terminates in a weight 69 at its outer end. Thus, as the wheel 12 rotates the bellcranks 64 rotate bodily around the axis of the wheel and their weighted arms 66 swing outwardly or away from said axis (Fig. 2) and the angular movement of the arms 66 increases as the speed of rotation of the wheel 12 increases.

Centrally disposed between the bifurcated ends 67 of the bellcranks 64 is a lateral flange 70 integrally projecting from a needle valve 71. This valve 71 is operatively disposed in the fluid line 42 to normally permit the flow of hydraulic fluid through said line. The valve 71 comprises a casing or housing 72 pierced by a longitudinal passage or bore 73 and a transverse bore 74 opening at one end through a side of the housing 72 and at its other end in open communication with the bore 73. The supply line 42 is operatively connected to the outer end of the bore 73 and also to the outer end of bore 74.

A slideable stem 75 is disposed in the inner end of the bore 73 and extends beyond the limits of the housing 72 to terminate in the flange 70. The shank of the stem 75 has substantially the same diameter as the bore 73 for the relatively snug cooperation therewith, the end of said stem 75 opposed to the flange 70 being tapered to create a relatively sharp point 76. A compression spring 77 encircles the stem 75 between the housing 72 and a retaining member or peripheral shoulder 78 integral with the shank of said stem. Under the normal action of the spring 77 the stem 72 is held outwardly of the valve housing 72 with the flange 70 thereof centrally disposed between the bifurcated ends 67 of bellcranks 64. In this position of the stem 75 its tapered end 76 is disposed in the intersection of the bores 73 and 74 whereby fluid in the line 42 is permitted to flow freely therethrough. However, when the rotation of the wheel 12 has caused a rotation (Fig. 2) of the weighted bellcranks 64, the bifurcated ends 67 thereof by engagement with the flange 70 moves the stem 75 inwardly of the valve 71 in opposition to the spring 77 whereby said valve is proportionally closed and reduces the degree of steering movement that can be imparted to the wheel 12 by the damping unit 30.

From the foregoing, it is apparent that the rate of revolution of the wheel 12 automatically adjusts the relative position of the stem 75 to thereby control the amount of fluid under pressure passing through the line 42 and delivered to the valve 43 which directs its flow into either side of the vanes 32' for ultimate movement or steering of the wheel 12. Since the valve 71 meters the flow of fluid through the line 42 it also regulates the fluid pressure within the chamber 35 so that as the valve gradually closes the pressure available for steering decreases until the valve is fully closed when it is locked against steering movement. Additionally when pressure in line 42 is zero the valve 57 opens and returns the damper 30 to normal operation. It is equally apparent that upon the full compression of the spring 77 the shank of the stem 75 is moved inwardly of the valve beyond the intersection of bores 73 and 74 therein to completely close or block the further intercommunication thereof whereby no pressurized fluid is delivered to the valve 43. When this occurs, the absence of fluid or fluid pressure in line 56 allows the rotary valve 57 to return to its normal or central position under the action of the spring 59 whereby to reestablish the free flow of fluid through the by-pass 38 whereupon the unit 30 becomes operative to damp oscillations of the castered wheel 10 since it can no longer operate to steer the wheel 12.

This invention primarily is directed to a steering system employing the damping unit 30 to directionally change the position of the wheel 12. The structural and functional details of the several components, such for example as the valves 43, 52, 57 and the electrical units, per se, form no part of the present invention. Indeed most of the components are standard parts procurable on the open market requiring only slight, if any, modification to adapt them to the present system.

What is claimed is:

1. In a steering system for airplanes the combination with a freely rotatable nose wheel mounted for castering movement, of a damper to restrict the castering of said wheel including means to positively lock said wheel against castering, means simultaneously and concurrently operable with said locking means to cause the angular displacement of the wheel in either direction against the action of said locking means, and a control automatically responsive to the rotation of the wheel to regulate the degree of angular displacement of the wheel in proportion to the speed of the airplane in travelling on the ground.

2. In a steering system for airplanes the combination with a castered ground engaging wheel, of a hydraulic damper for restricting said wheel against castering including means adjustable to lock the wheel against castering, a hydraulic steering means simultaneously and concurrently operable with the adjustment of the locking means for the angular displacement of the wheel in either direction while said locking means remains adjusted, a control valve to regulate and adjust the degree of operation of the aforesaid steering means, and a centrifugal unit operatively connected to the wheel and to the control valve for the actuation of said valve in proportion to the speed of rotation of the wheel.

3. In a steering system for airplanes the combination with a spindle mounted for oscillation, of a ground engaging wheel mounted for rotation on said spindle, a hydraulic damper having at least two chambers separated by a rotary vane fixedly attached to the spindle, said chambers being normally filled with hydraulic fluid, a by-pass connecting said chambers to permit fluid flow between the chambers occasioned by the rotation of the vane with the spindle, a valve in said by-pass adapted to completely close the by-pass and thereby lock the vane and its attached spindle against oscillation, and independent means for introducing fluid into either of said chambers to overcome the locking action resulting from the closing of said by-pass as aforesaid.

4. In a power steering system for airplanes the combination with a castered ground engaging wheel, of a damping unit operatively connected to said wheel to limit its castering movement comprising a rotatable shaft having a fixedly attached vane surrounded by and responsive to pressurized hydraulic fluid within the damping unit, a connection for the limited passage of said fluid from one side of said vane to the other, a control for completely closing said connection to thereby lock the wheel against all castering movement, and individual means operable concurrently with the control to selectively deliver additional fluid to either side of the vane to cause the rotation of the shaft against the action of said control.

5. In a power steering system for airplanes the combination with a castered ground engaging wheel, of a damping unit operatively connected to said wheel to limit its castering movement comprising a rotatable shaft having a fixedly attached vane surrounded by and responsive to pressurized hydraulic fluid within the damping unit, a connection for the limited passage of hydraulic fluid from one side of said vane to the other, a control valve to completely close said connection and thereby lock the wheel against all castering movement, a second control valve operable concurrently with said first control valve to deliver additional fluid to either side of the vane to cause the rotation of the shaft against the action of said first control valve, and control means automatically operable to regulate the quantity and pressure of said additional fluid delivered to either side of the vane as aforesaid.

6. In a steering system for airplanes the combination with a nose wheel landing gear assembly including a retractable telescopic shock-absorbing strut, a wheel operatively mounted for castering movement at the outer end of said strut, a downlock mechanism automatically operable for the retention of the strut in the protracted position, and means interposed between the strut and the wheel to restrict the castering movement of said said wheel, of a hydraulic power unit for the rotation of the wheel relative to the strut in opposition to the action of the restricting means, a solenoid valve to control the flow of hydraulic fluid to the power unit for the operation thereof, an electric circuit associated with the solenoid valve for the actuation of said valve, a pair of switches to close said circuit automatically upon the operation of the downlock mechanism and of the restricting means aforesaid, and a control valve disposed between the solenoid valve and the power unit and controlled by the rotation of the wheel to regulate and adjust the degree of operation of the power unit in proportion to the speed of rotation of the wheel.

7. In a steering system for airplanes the combination with the nose wheel landing gear assembly including a rectractable shock strut, a wheel mounted for castering on the outer end of said strut and means disposed between the strut and the wheel to restrict the castering movement of the wheel, of a hydraulic power assembly organized and arranged to positively caster the wheel in either direction against the action of said restricting means, a solenoid valve to operatively connect said power assembly with a source of hydraulic fluid upon the actuation thereof, an electric circuit interposed between the strut and the solenoid valve for the actuation of the valve upon the protraction of the strut, a needle valve disposed between the solenoid valve and the power assembly to regulate fluid supplied to the assembly, and a governor operatively connected to the wheel and to the needle valve for the adjustment thereof.

8. In a steering system for airplanes the combination with the nose wheel landing gear assembly including a retractable shock strut, a wheel mounted for castering at the outer end of said strut, a down-lock to maintain the strut in the protracted position, and means disposed between the strut and the wheel to restrict the relative castering movement of the wheel, of a power assembly for the independent operation of the restricting means to positively caster said wheel in either direction against the action of the restricting means, a hydro-electric valve to establish the operation of said power assembly, an electric circuit interposed between the strut and the valve for the operation, and a pair of switches one actuated by the operation of the down-lock and the other actuated by the operation of the restricting means to complete the circuit aforesaid.

9. In a steering system for airplanes the combination with the nose wheel landing gear assembly including a shock strut, a wheel mounted to caster at the outer end of the strut, and means operative between said strut and said wheel to restrain the castering movement of the wheel, of a power assembly operable to disconnect said means and simultaneously lock the wheel against all castering and concurrently adapt said wheel for castering in opposition to such locked condition, a control operative to positively and selectively caster said wheel, and means responsive to the speed of rotation of the wheel for regulating said power assembly and thereby limiting the degree of positive castering of the wheel as aforesaid.

10. In a steering system for airplanes the combination with the nose wheel landing gear consisting of a shock strut, a wheel mounted for castering movement at the outer end of said strut, a down-lock to secure the strut in the protracted position, and means associated with the strut and wheel to restrain the castering movement of the wheel, of means for rendering said restraining means ineffective and simultaneously locking the wheel against all castering movement, a power assembly associated with said restraining means and operable for positively and selectively castering the wheel in opposition to the restraining means while said wheel is locked against castering movement, a control to effect the operation of the power assembly, and means responsive and in proportion to the speed of rotation of the wheel for the regulation and adjustment of said power assembly.

11. In a steering system for airplanes the combination with the nose wheel landing gear including a retractable shock strut and a wheel mounted for castering movement at the outer end thereof, of hydraulic restricting means to limit the castering movement of the wheel, hydraulically actuated means to render said restricting means effective to lock the wheel against castering movement, an independent control to regulate the operation of said hydraulically actuated means, and a supplemental hydraulic system associated with said restricting means to selectively and positively caster said wheel in either direction after said restricting means has locked the wheel as aforesaid.

12. In a steering system for airplanes the combination with a landing gear assembly consisting of a retractable strut and a ground engaging element mounted for castering movement at the outer end thereof, of means for locking said ground engaging element against castering, means for selectively and positively displacing said ground engaging element, and independent control means effectively operative only upon the complete operation of said locking means to initiate operation of said displacing means.

13. In a steering system for airplanes the combination with the nose wheel landing gear assembly consisting of a shock strut and a wheel mounted for castering movement at the outer end thereof, of a hydraulic unit operatively connected to said wheel to normally restrict its castering movement, a valve operative on said hydraulic unit to prevent its normal operation and thereby lock said wheel against castering movement, a supplemental hydraulic assembly associated with said hydraulic unit for the operation thereof to selectively and angularly displace the wheel out of its locked position as aforesaid, and independent means interposed between said hydraulic assembly and said valve to initiate operation of the former only after completion of operation of the latter.

14. In a steering system for airplanes the combination with a landing gear assembly consisting of a rotatably mounted strut, a ground engaging wheel mounted for rotation at the end of the strut, a hydraulic damper carried by the strut including a shaft, a vane secured to the shaft and creating at least two chambers filled with hydraulic fluid which acts on the vane to restrict the movement of the vane and shaft, a by-pass connecting said chambers and a connection interposed between the shaft and strut whereby the rotation of the strut is restrained by the action of the fluid in said chambers on the vane, of a valve to completely close the by-pass and thereby lock the vane and shaft against movement, means for delivering supplemental hydraulic fluid to either of said chambers whereby the vane and shaft are rotated in either direction against the action of said valve in its closed position aforesaid and said wheel is correspondingly displaced, a valve for selectively controlling the delivery of supplemental fluid to either of the chambers as aforesaid, and means for automatically closing the by-pass valve when the control valve is in operative condition.

15. In combination with a vehicle having a controlled member and a wheel assembly including a wheel rotatable at a rate proportional to the speed of the vehicle: a hydraulic motor mechanically connected to said controlled member for moving it; a selector valve having a pair of line passages and selectively actuatable for selectively connecting said motor between said line passages to energize the motor and apply a moving force to said controlled member in response to a pressure differential between said line passages; a manual control member and means coupling it to said selector valve; a source of pressure fluid; a variable-flow control valve; means connecting said source, said line passages and said control valve in series relation to each other in a single hydraulic circuit; and valve actuating means actuated by said wheel and continuously responsive to variation in the rate of rotation thereof connected to said control valve for actuating it to vary flow therethrough in inverse ratio to the rate of rotation of said wheel.

16. In a steering system for vehicles the combination with a wheel mounted for castering on said vehicle and means disposed between the vehicle and the wheel to restrict the castering movement of the wheel, of a power assembly organized and arranged to positively caster the wheel in either direction against the action of said restricting means, a valve operable to connect said power assembly with a source of fluid, control means interposed between the vehicle and valve for actuation of the valve, a needle valve disposed between said valve and the power assembly to regulate fluid supplied to the assembly, and a governor operatively connected to the wheel and to the needle valve for the adjustment thereof.

References Cited in the file of this patent

UNITED STATES PATENTS

| | | |
|---|---|---|
| 2,199,681 | Timm | May 7, 1940 |
| 2,372,710 | Chisholm | Apr. 3, 1945 |
| 2,401,364 | Mercier | June 4, 1946 |
| 2,621,002 | Pittman | Dec. 9, 1952 |
| 2,734,589 | Groen | Feb. 14, 1956 |